United States Patent
Parsons et al.

(10) Patent No.: US 6,558,721 B1
(45) Date of Patent: May 6, 2003

(54) APPARATUS AND METHOD FOR DISTRIBUTING A PARTICULATE CHARGE OVER AN ARTICLE

(75) Inventors: Michael Parsons, Birmingham (GB); John Thomas Rowley, Birmingham (GB)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/285,718

(22) Filed: Apr. 5, 1999

(30) Foreign Application Priority Data

Apr. 3, 1998 (GB) .............................. 9807247

(51) Int. Cl.[7] .......................... A23P 1/08; B05C 19/04; B05C 19/06
(52) U.S. Cl. .......................... 426/289; 99/494; 118/24; 118/308
(58) Field of Search ................................ 426/289, 292, 426/297; 99/450.1, 450.6, 494, 450.7; 118/13, 16, 24, 308, 324

(56) References Cited

U.S. PATENT DOCUMENTS

| 3,615,598 | A | * | 10/1971 | Funakoshi et al. | 426/289 |
| 3,648,596 | A | * | 3/1972 | Zito | 426/289 X |
| 3,820,503 | A | | 6/1974 | Tabernacki | 118/24 X |
| 3,908,584 | A | * | 9/1975 | Raque | 118/16 X |
| 4,152,976 | A | | 5/1979 | Kawasaki et al. | 99/450.1 |
| 5,109,760 | A | | 5/1992 | Ansari | 99/494 |
| 5,282,414 | A | | 2/1994 | Chen | 99/353 |
| 5,523,101 | A | * | 6/1996 | Fitch, Jr. | 426/289 |
| 6,032,610 | A | * | 3/2000 | Fitch, Jr. et al. | 99/494 X |

FOREIGN PATENT DOCUMENTS

| EP | 0787431 A1 | | 8/1997 |
| EP | 0818669 | * | 1/1998 |
| FR | 2722656 | | 7/1994 |
| GB | 810559 | | 1/1957 |
| GB | 2 288 595 A | | 10/1995 |

* cited by examiner

Primary Examiner—Arthur L. Corbin
(74) Attorney, Agent, or Firm—Staas & Halsey LLP (57) ABSTRACT

An apparatus and method for distributing a charge falling onto an article. The apparatus includes a baffle to present a continuous deflection surface to the falling charge, the deflection surface deflecting at least a portion of the charge radially outwardly, and a guide arranged downstream of the baffle to deflect at least a portion of the charge radially inwardly to cause the charge to fall onto the article with a required distribution. The baffle and the guide may be adjustably mounted such that the relative positions of the guide and the baffle can be adjusted to achieve a desired distribution of the charge.

40 Claims, 9 Drawing Sheets

APPARATUS AND METHOD FOR DISTRIBUTING A PARTICULATE CHARGE OVER AN ARTICLE

CROSS-REFERENCE TO RELATED APPLICATIONS

This application is based upon and claims priority of British Patent Application No. 9807247.3 filed Apr. 3, 1998, the contents being incorporated herein by reference.

BACKGROUND OF THE INVENTION

1. Field of the Invention

The present invention relates to a method and apparatus for distributing a charge as it falls towards an article.

2. Description of the Related Art

A conventional system for distributing a particulate charge as it falls towards an article is disclosed in U.S. Pat. No. 5,109,760. In the conventional system, a conical screen is supported above a pizza upon which cheese is to be deposited. Cheese particles are dropped in a mass upon the screen and distributed by gravitational force in an even pattern over the pizza. The conical screen has a baffle portion at an upper region of the screen, a circular opening at the apex of the baffle, and a screen with screen openings at a lower region of the screen. The conical screen is mounted in a cylinder with a gap between the outer periphery of the screen and the cylinder. Cheese particles deposited upon the pizza will either have fallen through the opening in the apex of the screen, the screen openings, or the gap between the screen and the cylinder.

An alternative system for distributing a particulate charge is described in U.S. Pat. No. 5,678,476. In this alternative system, a food feed hopper is mounted above a food spreader housing having movable paddles therein and a porous bottom member spaced above the surface upon which the food is to be spread.

A problem with the systems disclosed in U.S. Pat. Nos. 5,109,760 and 5,678,476 is that the particulate charge can be unevenly distributed. In particular, it is difficult to direct product to the center of the article. U.S. Pat. No. 5,109,760 attempts to address this problem by providing a circular opening at the apex of the baffle so that the product in the center falls straight through.

SUMMARY OF THE INVENTION

It is an object of the present invention to provide a system for distributing a particulate charge as it falls towards an article.

It is another object of the present invention to provide a baffle, a director and a guide for distributing a particulate charge as it falls towards an article, the director directing at least a portion of the charge radially inwardly onto the baffle, the baffle deflecting the charge outwardly and the guide deflecting the charge inwardly.

Objects and advantages of the present invention are achieved in accordance with a first embodiment of the present invention with an apparatus for distributing a charge falling onto an article, comprising a baffle to deflect at least a portion of the charge radially outwardly; a director arranged upstream of the baffle to direct at least a portion of the charge radially inwardly onto the baffle; and a guide arranged downstream of the baffle to deflect at least a portion of the charge radially inwardly, wherein the charge falls onto and is distributed across the article. The baffle may present a continuous deflection surface to the charge.

Objects and advantages of the present invention are achieved in accordance with a second embodiment of the present invention with a method of distributing a charge falling onto an article, comprising the steps of directing at least a portion of the charge radially inwardly onto a baffle with a director arranged upstream of the baffle; deflecting at least a portion of the charge radially outwardly with a baffle; and deflecting at least a portion of the charge radially inwardly with a guide arranged downstream of the baffle, wherein the charge falls onto the article and is distributed across the article.

The present invention provides an apparatus for and a method of directing a charge toward the center of an article which has advantages over the prior art. For example, U.S. Pat. No. 5,109,760 directs particles towards the center of the article by the provision of an opening in the baffle. In contrast, the present invention deflects a portion of the charge towards the center of the article using a guide arranged downstream of the baffle. The effect of the baffle is enhanced by directing at least a portion of the charge so that it is moving with a radially inward component as it strikes the baffle. This increases the angle of deflection of the baffle.

By deflecting a portion of the charge towards the center of the article using the guide arranged downstream of the baffle a number of advantages are achieved with the present invention. Firstly, the present invention enables the baffle to present a continuous deflection surface to the charge, in contrast to U.S. Pat. No. 5,109,760 where the baffle requires a central opening. As a result, the baffle is more easily constructed, easier to support and easier to clean. Secondly, it has been discovered that surprisingly the distribution can be conveniently controlled by adjusting the relative positions of the baffle and the guide. In contrast, in U.S. Pat. No. 5,109,760 the particle distribution is fixed by the form of the conical screen.

In accordance with the present invention, the baffle may deflect the charge by rotating about a vertical axis. However, the baffle preferably has an outwardly angled deflection surface which deflects the charge radially outwardly. The baffle can then deflect the charge radially without moving.

In accordance with the present invention, the deflection surface can be suitably shaped to provide a desired distribution. For example, if a circumferentially uniform distribution is required (e.g., on a pizza), then preferably the deflection surface is substantially frustoconical.

In accordance with the present invention, the guide and/or baffle are adjustably mounted, wherein the relative positions of the guide and the baffle can be adjusted to achieve a desired distribution. In accordance with an embodiment of the present invention, the baffle is slidably mounted on a baffle support and locking means is provided to lock the baffle at a required position. In accordance with another embodiment of the invention, the baffle has a threaded bore which receives a threaded baffle support and the baffle is moved by screwing it up or down the threaded baffle support.

In U.S. Pat. No. 5,109,760, the conical screen is supported by ledge pins which extend radially towards the screen, and it is not possible to suspend the screen from above since this would obscure the central opening at the apex of the screen. In contrast, in accordance with the present invention, the baffle can be supported by a baffle support which extends towards the baffle from a position upstream of the baffle.

Therefore, in accordance with the present invention, the baffle and the baffle support together present the continuous deflection surface to the falling charge. This support arrangement is simple and more sturdy than that disclosed in U.S. Pat. No. 5,109,760.

In accordance with the present invention, the director may comprise a set of air jets which direct the charge radially inwardly onto the chute. Alternatively, the director may comprise a chute having inwardly tapered walls which define a convergence position, wherein the baffle is arranged at least partially upstream of the convergence position.

As a result, at least a portion of the charge is converging as it strikes the baffle. The chute is typically frustoconical, although alternative tapered shapes could be used.

In accordance with the present invention, the chute preferably has an outlet and inwardly tapered walls which define a convergence position, and the baffle is arranged between the outlet and the convergence position and the chute focuses at least a portion of the charge onto the baffle. This focusing of the charge increases the angle of deflection by the baffle, and thus ensures that at least part of the charge is subsequently deflected radially inwardly by the guide and deposited at the center of the article.

In accordance with embodiments of the present invention, the apparatus further comprises a second baffle arranged upstream of the outlet of the chute for deflecting the charge radially outwardly. The second baffle also acts to break up the main mass of the charge.

The guide may be fixed, or the apparatus may further comprise means for moving the guide to and from a masking position adjacent to or abutting with the article whereby the charge falls onto the article with a border defined by the guide. In a preferred embodiment, the guide comprises a fixed outer cylinder and a movable inner cylinder which can be moved to and from the article. The guide and chute may be formed integrally, but preferably they are separated by a gap. This provides access to the interior of the system and enables the relative positions of the guide and chute to be adjusted.

The charge may comprise any suitable charge which can be deflected by the guide and the baffle. The charge is typically particulate and the particles may have a variety of sizes ranging from powdery or granular particles to even larger particles. In a preferred embodiment, the charge comprises particles of food. For example, the charge may comprise breadcrumbs, or a pizza topping such as cheese, pepperoni, mushrooms etc.

The article may be inedible (for example a plate or baking tray) but in a preferred embodiment the article comprises an article of food such as a pizza base.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
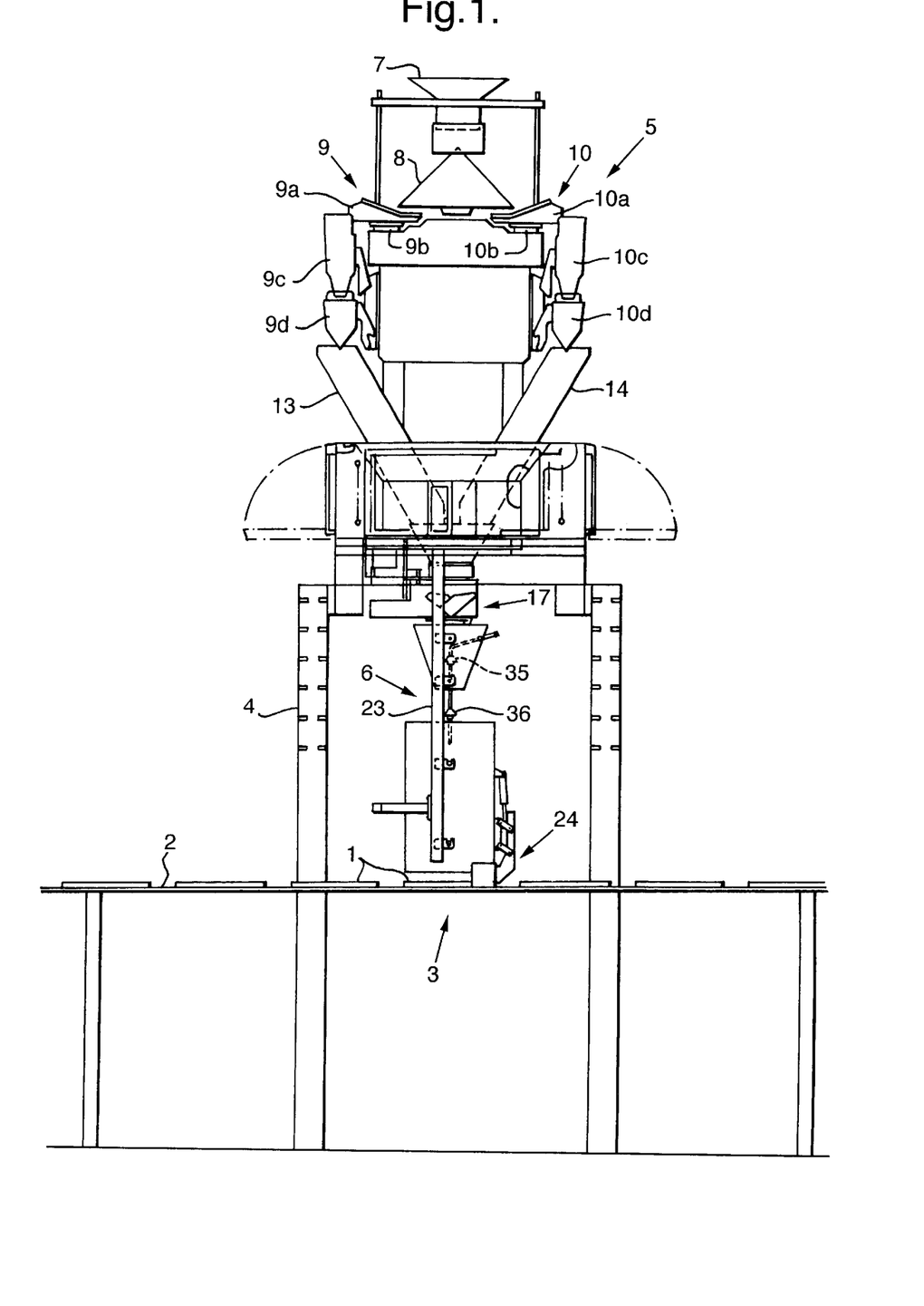
FIG. 1 is a front view of an apparatus for depositing a charge onto an article in accordance with a first preferred embodiment of the present invention.
Figure 2:
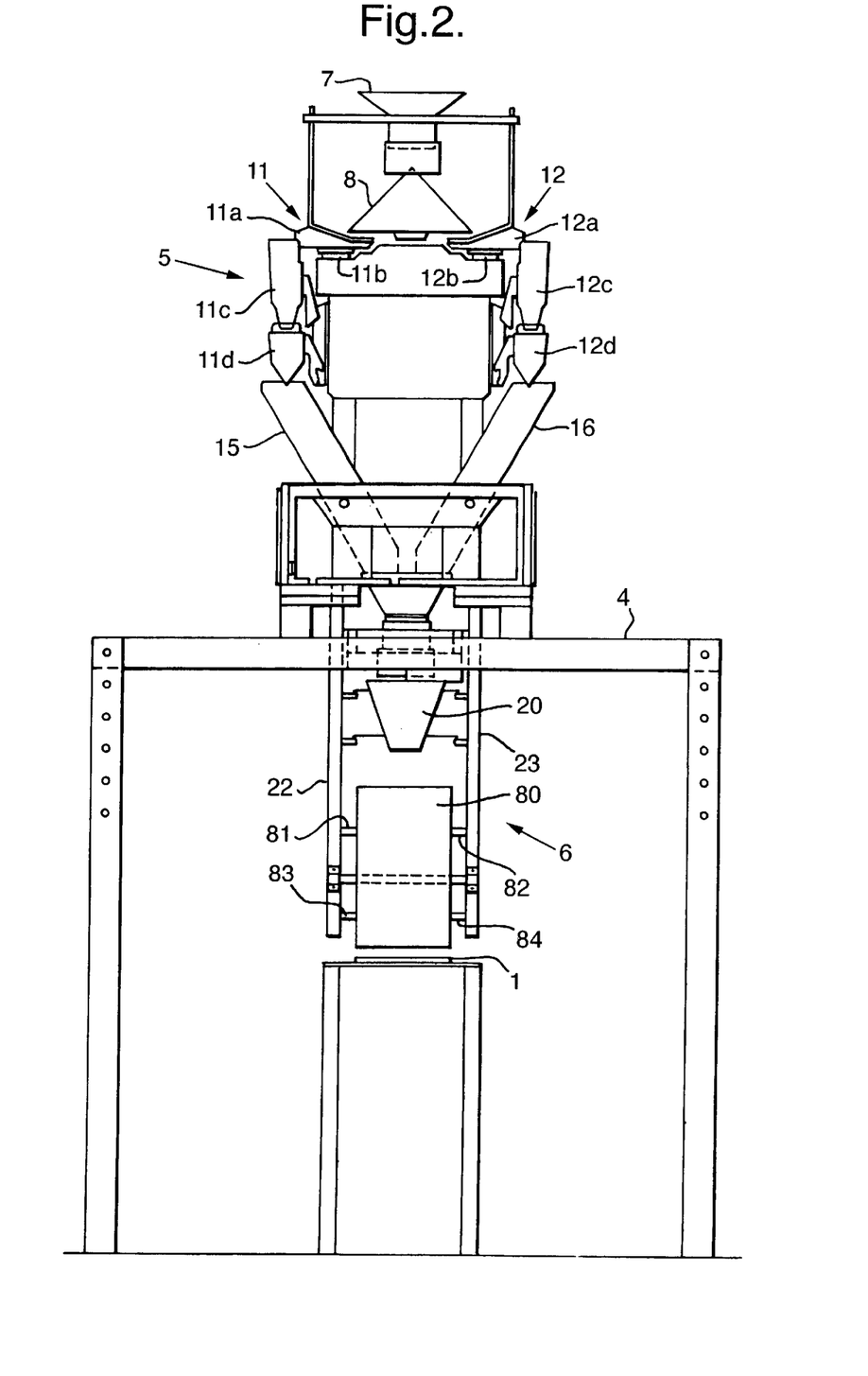
FIG. 2 is a side view of the apparatus shown in FIG. 1 in accordance with the first embodiment of the present invention.

Referring to FIGS. 1 and 2, a series of articles 1, for example, pizza bases, are transported on a conveyor 2 to a deposition position 3. A dosing system comprising a combinational weigher 5 and a distributor 6 is mounted above the deposition position 3 on a frame 4.

The combinational weigher 5 comprises a funnel 7 into which a charge, for example, grated cheese, is fed. The cheese falls down a cone shaped dispersion device 8 onto a number of weighing units 9–12 which are distributed around the periphery of the dispersion device 8. Each weighing unit 9–12 includes a trough-shaped dispersion feeder 9a–12a coupled with an electromagnetic vibrator 9b–12b. Each weighing unit 9–12 also includes a pool hopper 9c–12c into which the grated cheese is supplied via the trough shaped dispersion feeders 9a–12a as they are vibrated, each pool hopper opening via a respective gate into a weigh hopper 9d–12d. Each weigh hopper 9d–12d is coupled with a respective scale cell (not shown) so that the weight of their contents can be determined. The combinational weigher 5 described above is conventional and examples are described in more detail in, for example, EP-A-0818669.

Figure 4:
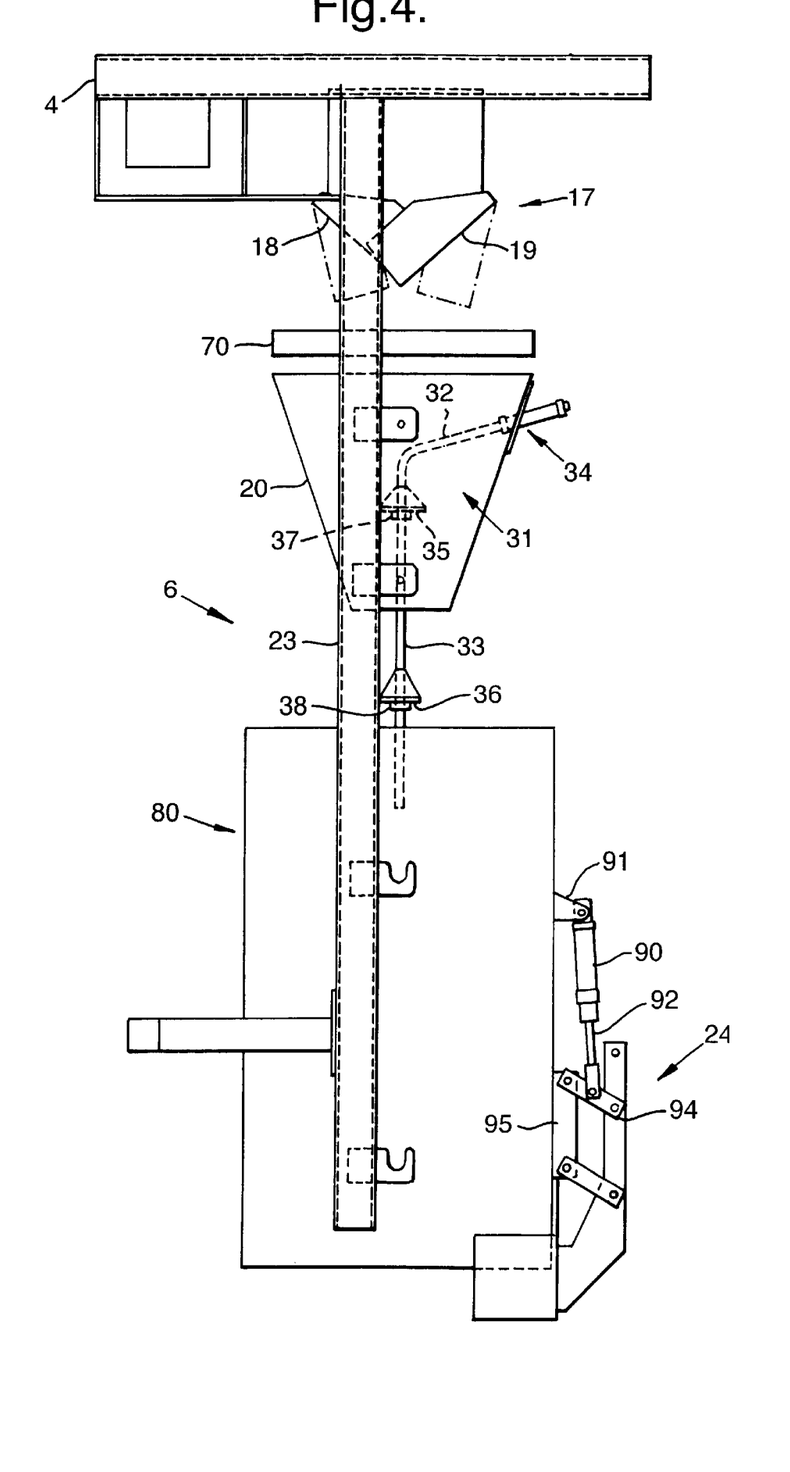
FIG. 4 is a side view, partially in section, of the apparatus for depositing a charge onto an article in accordance with the first embodiment of the present invention.

When a controlling microprocessor (not shown) of the combinational weigher 5 determines that a desired weight of grated cheese is located in a particular combination of the weigh hoppers 9d–12d, weigher gates (not shown) of selected weighers are opened so that their contents empty into chutes 13–16 which guide the cheese into a timing hopper 17 (shown in detail in FIG. 4).

Figure 3:
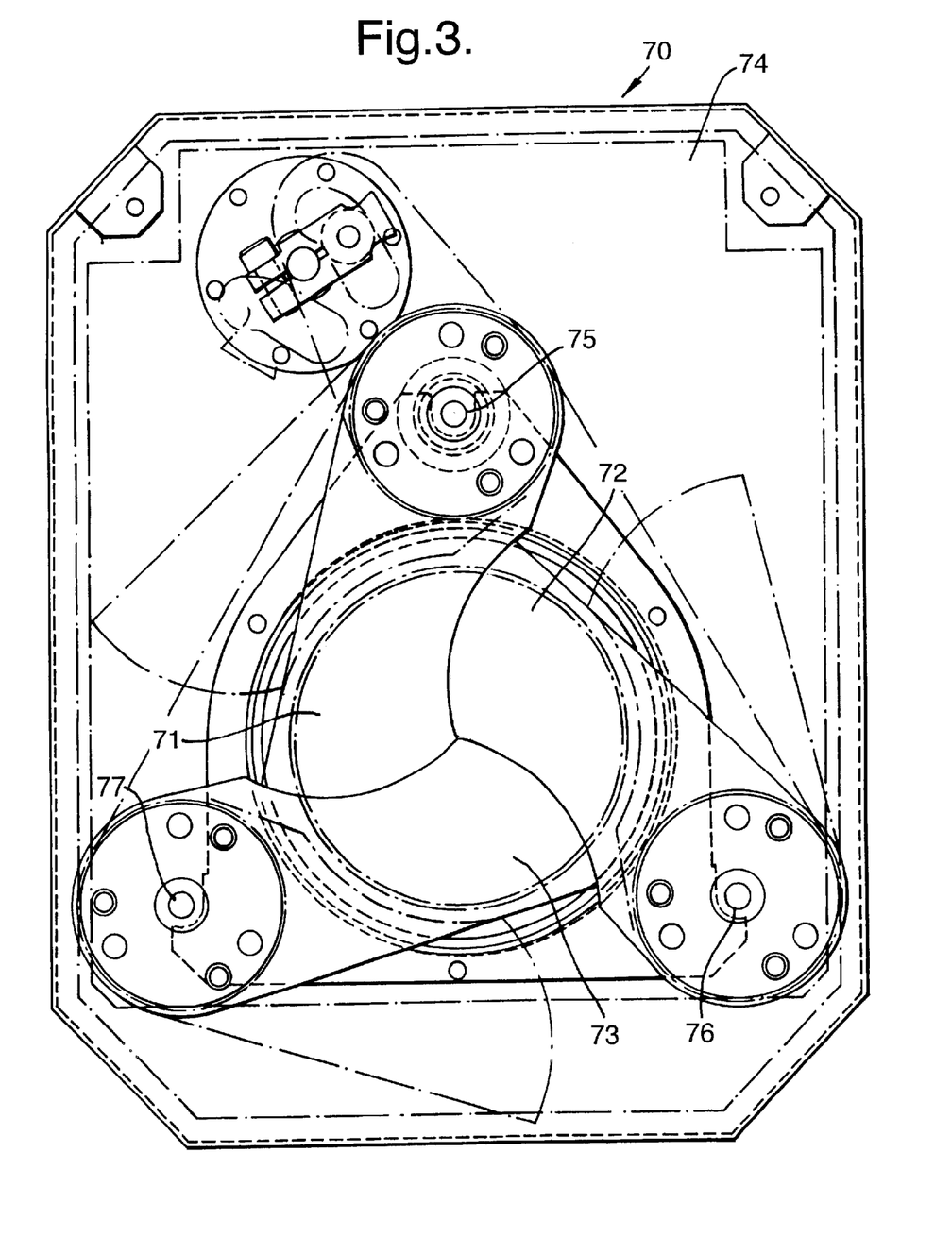
FIG. 3 is a plan view of a shutter mechanism shown in FIG. 1 in accordance with the first embodiment of the present invention.

As shown in FIG. 4, the timing hopper 17 includes a pair of pivoting doors 18, 19. At a suitable point in the cycle, such as when a pizza base 1 is at the deposition position 3, the pivoting doors 18, 19 are opened to release the charge onto an iris-type shutter mechanism 70. FIG. 3 is a plan view of the shutter mechanism 70. As shown in FIG. 3, three identical horizontal shutter blades 71–73 are shown in full lines in their closed position, and in chain-dotted lines in their fully open position. The shutter blades 71–73 are pivotally mounted on a base 74 by pivot pins 75, 76, 77, respectively. Shutter mechanisms of the type illustrated in FIG. 3 are described in more detail in EP-A-0787431, GB-A-2288595 and U.S. Pat. No. 5,806,725.

When a pizza 1 is at the position 3, the shutter blades 71–73 are rapidly opened so that the cheese is relatively undisturbed and falls directly downward into the distributor 6 over an area substantially equal to the area of the upper surface of the shutter blades 71–73.

As shown in FIGS. 2 and 4, the distributor 6 comprises a chute 20 in the form of an inverted frustocone, and a cylinder assembly 80. The cylinder assembly 80 and chute 20 are mounted on a pair of vertical support arms 22, 23 which are suspended from the frame 4 (FIG. 2).

Figure 5:
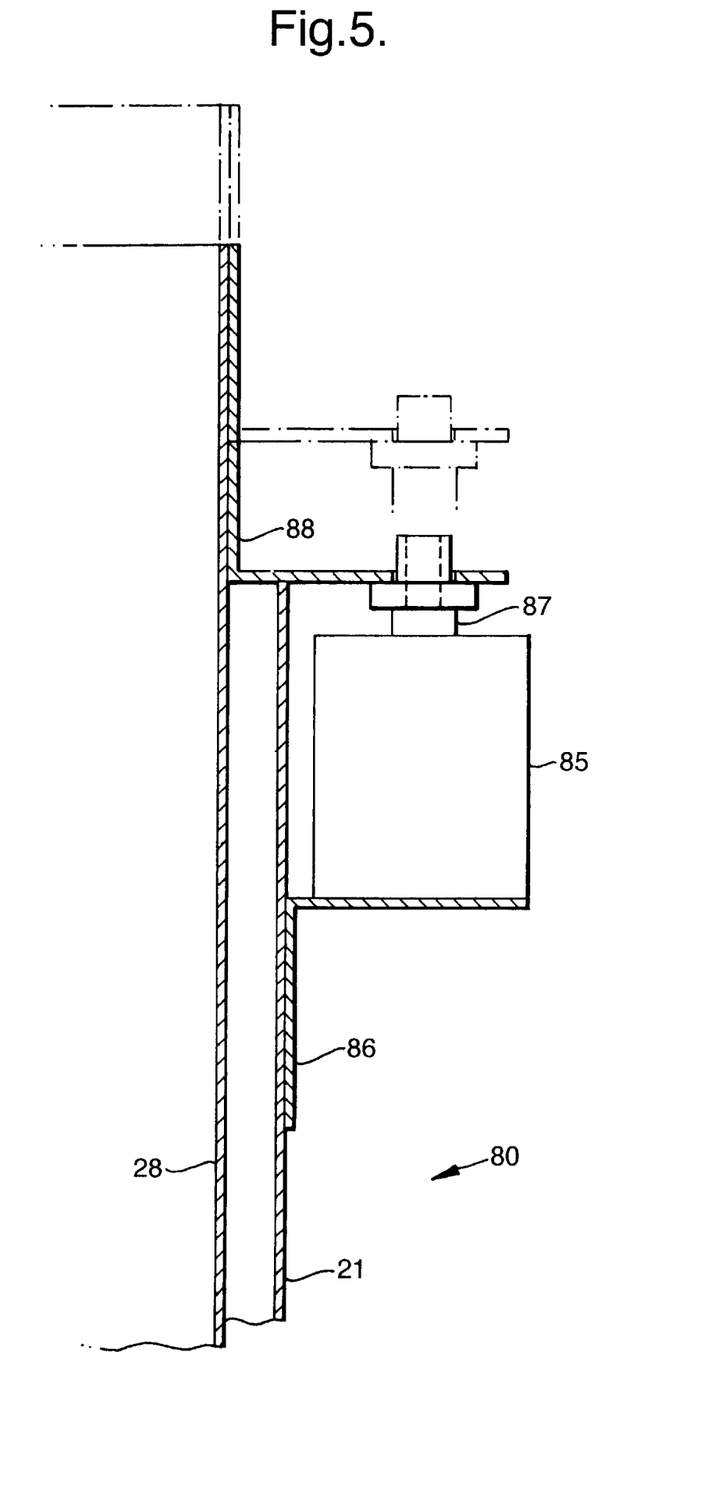
FIG. 5 is a cross-section of a cylinder assembly and drive mechanism of the apparatus shown in FIG. 1 in accordance with the first embodiment of the present invention.

FIG. 5 is a cross-section through an upper part of the cylinder assembly 80 showing a drive mechanism of the cylinder assembly in accordance with the present invention. The cylinder assembly 80 comprises an outer cylinder 21 which is rigidly mounted to the support arms 22, 23 by support pins 81–84 shown in FIG. 2. The outer cylinder 21 preferably has an inner diameter of 300 mm, although this will vary depending on the size of the pizzas. A pneumatic drive mechanism 85 is bolted to the outer cylinder 21 via a bracket 86. The drive mechanism has a drive arm 87 which is bolted to an inner cylinder 28 via a bracket 88. The inner cylinder 28 preferably has an internal diameter of 270 mm (suitable for 12"pizzas). The inner cylinder 28 is driven between a raised position (shown in dashed lines) and a lowered position (shown in solid lines) by the drive mechanism 85. An identical drive mechanism (not shown) is also provided on the opposite side of the cylinder assembly 80.

Three clamp assemblies are provided for clamping the pizza base 1 in the deposition position 3 below the cylinder assembly 80. The three clamp assemblies are distributed at equal angular distributions around the periphery of the cylinder assembly 80. Only one of the three clamp assemblies is shown in FIGS. 1 and 4, as indicated by reference numeral 24. Another one of the clamp assemblies 89 is shown in detail in FIG. 6.

Figure 6:
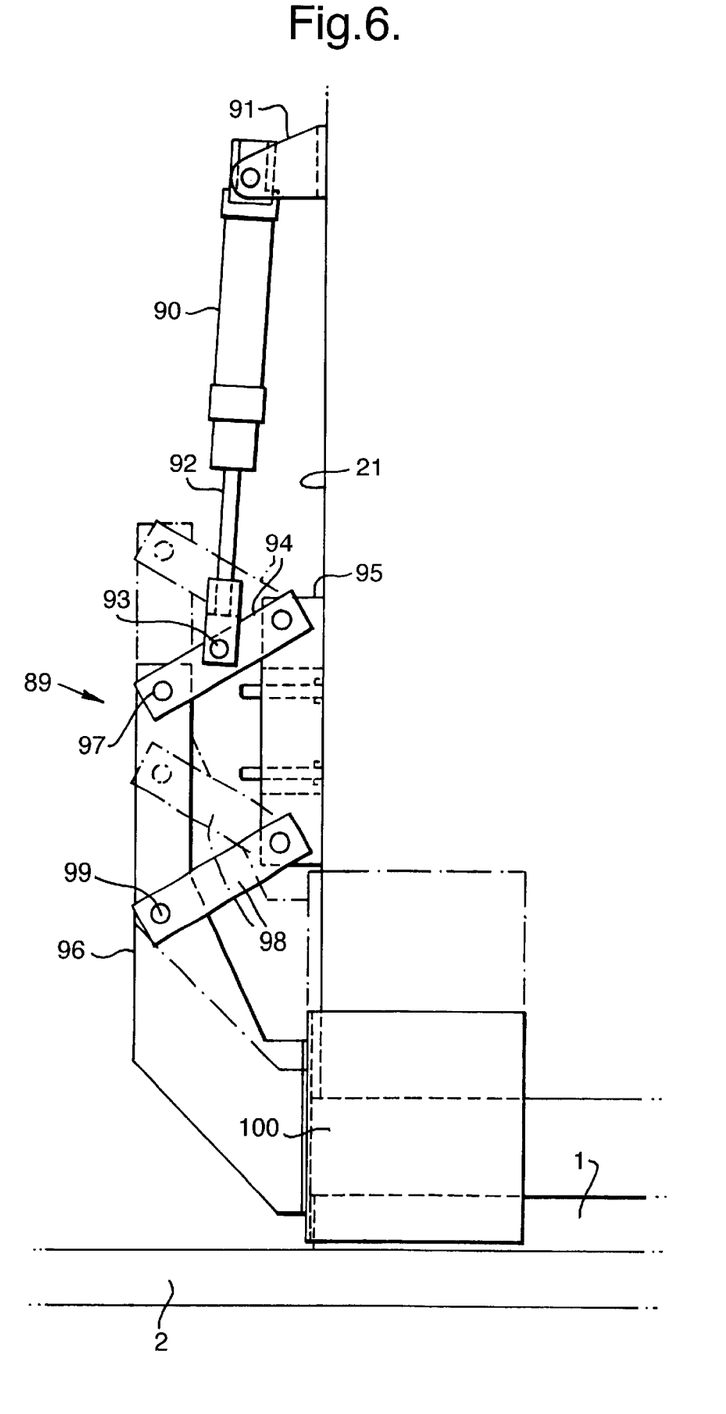
FIG. 6 illustrates in detail a clamp assembly shown in FIG. 1 in accordance with the first embodiment of the present invention.

As shown in FIGS. 4 and 6, a pneumatic cylinder 90 is pivoted on a bracket 91 which is bolted to the outer cylinder 21. A drive rod 92 of the cylinder is pivotally attached by an attachment 93 to a pivoting arm 94. The pivoting arm 94 is pivotally attached to a bracket 95, which is shown in its upper and lower positions in dashed and full lines respectively. An actuating arm 96 is pivoted to the pivoting arm 94 at pivot point 97, and to a second pivoting arm 98 at pivot point 99. The end of the actuating arm 96 includes a curved clamping segment 100, shown in full lines in its lowered clamping position and in dashed lines in its raised position.

As the drive rod 92 extends, the clamping segment 100 is lowered to its clamping position in which it engages the outer edge of a pizza base 1. When a pizza base 1 is in position, the three clamping segments are pivoted into position using the pneumatic cylinders 90 and the inner cylinder 28 is moved down using the drive mechanism until it abuts the pizza base 1.

Referring to FIG. 4, a suspension arm 31 having an angled portion 32 and a vertical portion 33 is mounted to the chute 20 at 34. A pair of conical baffles 35, 36 are threaded onto the vertical portion 33 of the suspension arm 31, and locked into place with a respective collar 37, 38 and locking pin (not shown). The baffles 35, 36 can be moved up and down by releasing their respective locking pin and sliding the baffle 35, 36 up or down the suspension arm 31 to a required position. An angle of the deflection surface of the upper baffle 35 is greater than an angle of the deflection surface of the lower baffle 36. The baffles 35, 36 have solid deflecting surfaces and, together with the suspension arm 31, present a continuous deflection surface to the falling charge. That is, there is no central hole as disclosed in U.S. Pat. No. 5,109,760.

Figure 7:
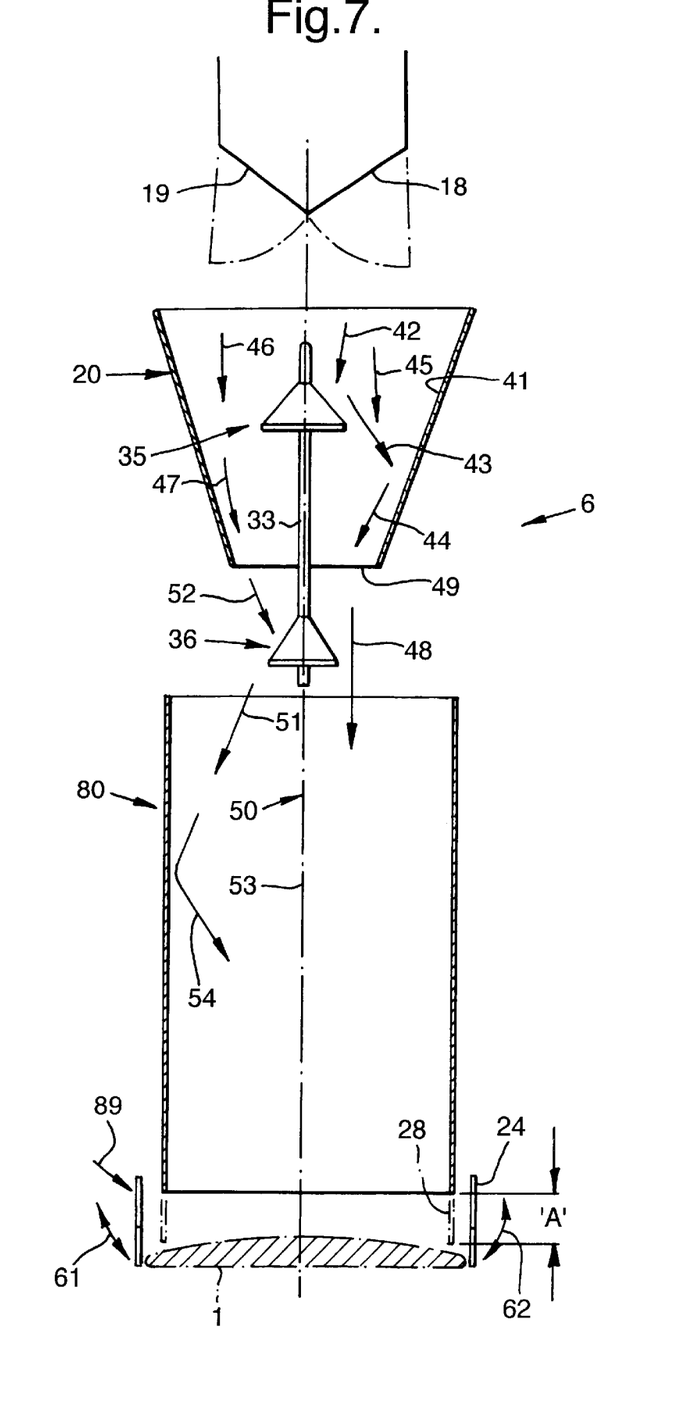
FIG. 7 is a schematic side view, partially in section, of the apparatus of FIGS. 1 and 2 showing a charge falling onto a pizza base in accordance with the first embodiment of the present invention.

FIG. 7 illustrates the principal of operation of the distributor 6. When a pizza base 1 is in position and clamped in place, the inner cylinder 28 is moved down to its masking position, and the shutter blades 71–73 (FIG. 3) are opened to release a charge into the distributor 6. As the charge is released, a portion of the charge hits the upper baffle 35 (as indicated by arrows 42–44), a portion (indicated by arrows 45–47) hits the tapered inner wall 41 of the chute 20 directly without hitting the upper baffle 35, and a portion (indicated by arrow 48) falls unimpeded through the outlet 49 of the chute 20. The upper baffle 35 acts to break up the main mass of the charge and push it out to the sides of the chute 20.

The lower baffle 36 is positioned downstream of the chute 20 between the outlet 49 of the chute 20 and a focal position (indicated generally at 50) which is defined by the convergence point of the tapered inner wall 41 of the chute 20. As a result, at least part of the charge converges radially inwardly onto the lower baffle 36, as indicated by arrow 52. The lower baffle 36 then reflects a portion of the charge out to the sides of the cylinder 28 as indicated by arrow 51. The charge is contained by the cylindrical inner wall of the inner cylinder 28, and some is deflected back towards the center line 53 as indicated by arrow 54. The result of the various deflections from the chute 20, baffles 35, 36 and cylinder 28 is a uniform distribution across the surface of the pizza base 1.

The proportions and angles of the chute 20, baffles 35, 36 and cylinder 28 are selected to give consistent results. The relative sizes may be varied to allow for different charge sizes and different amounts of bounciness of the articles passing through. The positioning of the lower baffle 36 can be adjusted to allow more or less product to be gathered at the periphery or in the center of the pizza base 1. In experiments it has been determined that as the lower baffle 36 is moved down, more cheese is deposited at the outer periphery of the pizza base 1.

Alternatively, the chute 41 and baffles 35, 36 may be moved away from the center line 53 to deposit the charge more towards one area of the pizza base 1.

When the cheese has been deposited, the clamping segments 24, 89 are rotated away from the pizza base 1 as indicated at 61, 62, the inner cylinder 28 is retracted by distance A to prevent the cylinder from dislodging the deposited cheese, and the coated pizza base 1 is transported away from the deposition position 3 by the conveyor 2.

In an alternative embodiment, the vertical portion 33 of the suspension arm 31 may be threaded, and the baffles 35, 36 may be provided with internally threaded bores. The baffles 35, 36 can then be adjusted by rotating the baffles so that they move up and down the support arm on the thread.

Furthermore, the combinational weigher 5 may be replaced by an alternative dosing device, such as a volumetric depositor, bucket system or any other apparatus which can deliver equal charges into the timing hopper 17. With an accurate dosing device the timing hopper 17 and/or the shutter assembly 70 may not be required. The timing hopper 17 may also have horizontally retracting doors, for instance as shown in U.S. Pat. No. 5,806,725.

If cheese collects on the angled portion 32 of the suspension arm 31, then the angle of the angled portion 32 can be increased from the angle shown in FIG. 3. In a further alternative embodiment, the suspension arm 31 may extend vertically into the timing hopper 17, with a suitable central aperture being formed by the pivoting doors 18, 19 and the shutter blades 71–73 to receive the suspension arm 31.

Figure 8:
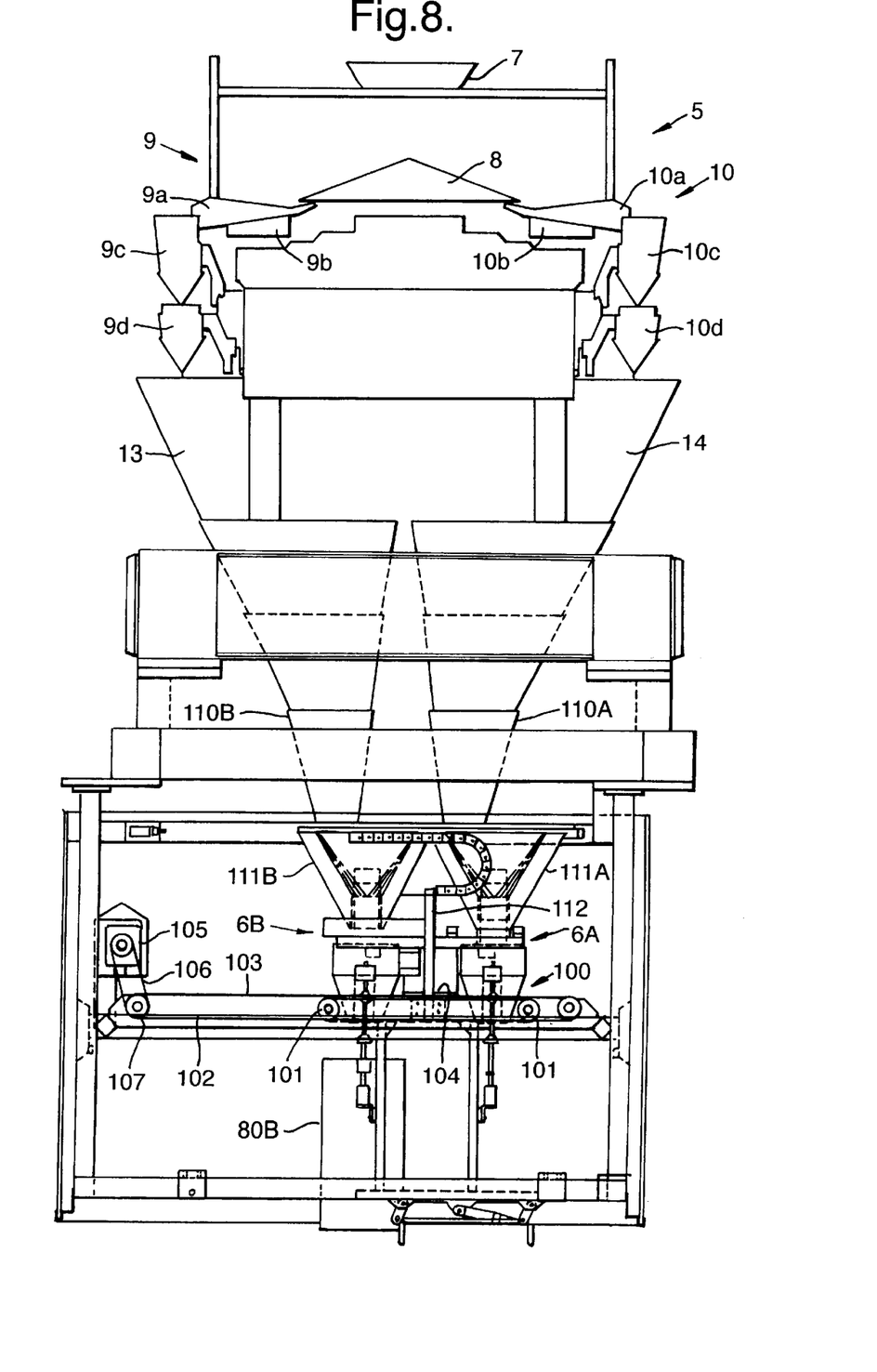
FIG. 8 is a front view of an apparatus for depositing a charge onto an article in accordance with a second preferred embodiment of the present invention.
Figure 9:
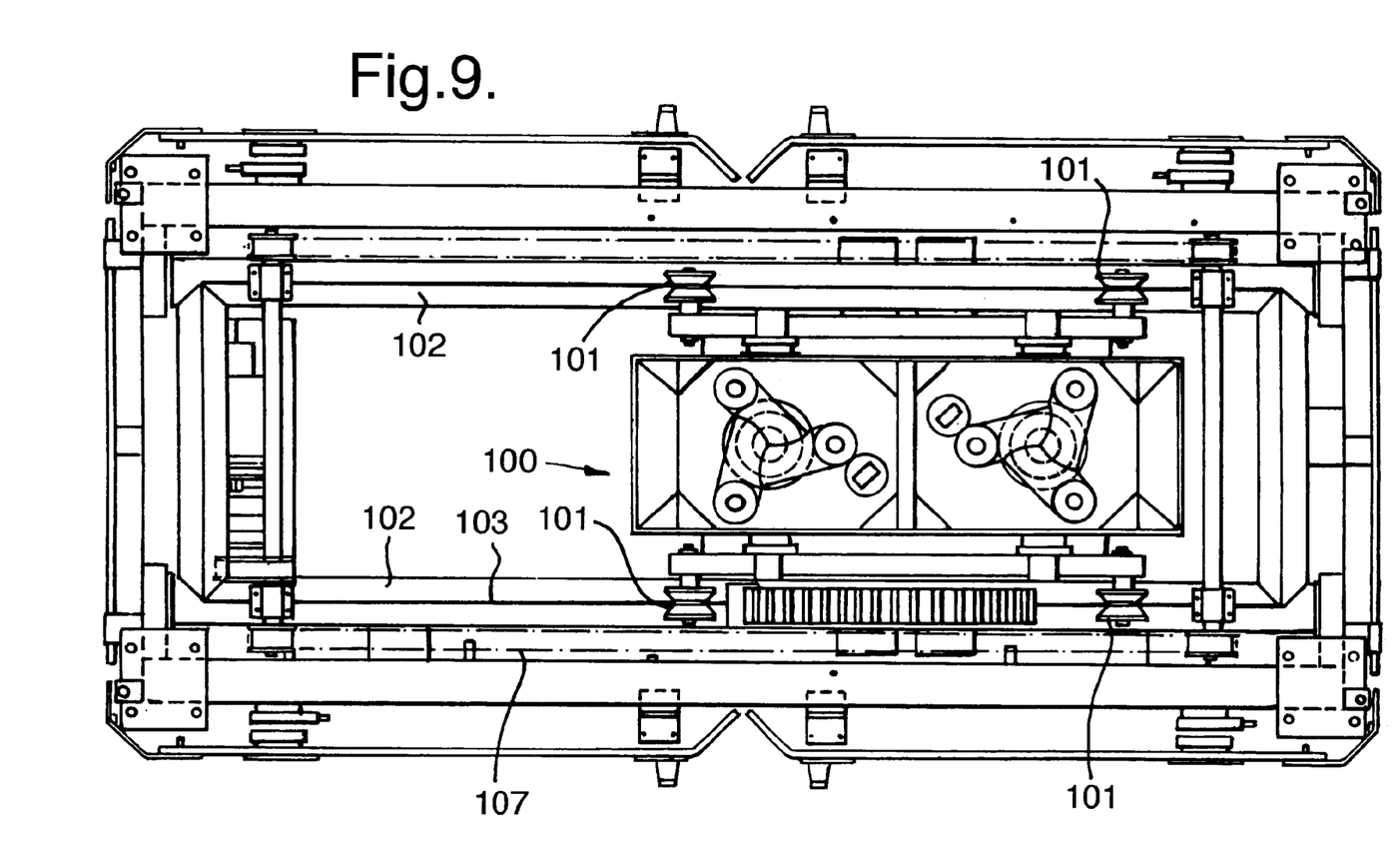
FIG. 9 is a plan view of a spreader system used in the apparatus shown in FIG. 8 in accordance with the second embodiment of the present invention.

In the first embodiment of the present invention described above with reference to FIGS. 1 and 7, a single delivery system is used. In order to increase production speed, the delivery system of the first embodiment can be arranged to traverse above the pizza as cheese is delivered. This could be carried out with a single delivery system, but in a second preferred embodiment of the invention shown in FIGS. 8 and 9, a double delivery system is used. As shown in FIG. 8, the double delivery system comprises a pair of distributors 6A, 6B having constructions very similar to the distributor 6 of FIG. 1. The distributors 6A, 6B are mounted to a carriage 100 which is supported by rollers 101 on a pair of laterally spaced tracks 102 (FIG. 9). The carriage 100 is driven via a drive belt 103 which is secured to the carriage at a securing point 104. The drive belt 103 is rotated by a motor 105 to which it is coupled via a drive belt 106 and a pulley 107.

The combinational weigher 5 shown in FIG. 8 has the same form as shown in FIGS. 1 and 2 and terminates in a pair of delivery funnels 110A, 110B located above entry funnels 111A, 111B of the distributors 6A, 6B respectively. The exits to the delivery funnels 110A, 110B are positioned so that they remain in alignment with the funnels 111A, 111B, respectively, throughout the lateral movement of the distributors 6A, 6B. As shown in FIG. 8, the funnels 110A, 110B are located at the left side of the funnels 111A, 111B while following maximum movement of the carriage 100 to the left, the funnels 110A, 110B will be aligned with the right hand side of the funnels 111A, 111B. One group of the weighing units 9–12 is associated with the funnel 110A and another group of the weighing units is associated with the funnel 110B.

In order to convey pneumatic control to the respective sets of shutter blades, a flexible delivery conduit system 112 is provided.

In operation of the delivery system in accordance with the second embodiment of the invention, the distributors 6A, 6B are located at a home position, as shown in FIG. 8. As a pizza is conveyed beneath the distributors 6A, 6B on a conveyer, the arrival of the first pizza is detected and the control system (not shown) which determines the speed of movement of the pizzas, waits until the pizza is aligned with a cylinder 80B of the distributor 6B and then activates the distributor 6B to lower the cylinder 80B, as previously described. The pizzas are supplied to the conveyor in such a manner that when a pizza is aligned with the distributor 6B, another pizza is aligned with the distributor 6A. (The cylinder of the distributor 6A is omitted in FIG. 8 for clarity). The distributors 6A, 6B are then operated as previously described, but at the same time the distributors 6A, 6B are caused to move with the pizzas by a suitable activation of the belt 103. During this movement, cheese is supplied to the pizzas. When the distributors 6A, 6B reach their leftmost position, the cylinders 80 are retracted allowing the pizzas to continue beyond the machine while the motor 105 is activated in its opposite direction to cause the carriage 100 to return to its start position shown in FIG. 8 and the process is then repeated.

The advantage of this process is that it allows pizzas to be fed at high speeds of up to 35 per minute while still allowing enough time for the cheese to be distributed. In the first embodiment, the pizzas would need to either be stopped during the distribution stage or to move more slowly to allow enough time for the cheese to be distributed.

In a further alternative embodiment, which is applicable to both the first and second embodiments described above, the cylinder arrangement is replaced by the use of two fingers which align the pizzas.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An apparatus for distributing a charge falling onto an article, comprising:
   a stationary baffle to deflect at least a portion of the charge radially outwardly;
   a director arranged upstream of the baffle to direct at least a portion of the charge radially inwardly onto the baffle; and
   a guide arranged downstream of the baffle to deflect at least a portion of the charge radially inwardly to cause the charge to fall onto the article and to be distributed across the article.

2. An apparatus as recited in claim 1, wherein the baffle has an outwardly angled deflection surface to deflect the charge radially outwardly.

3. An apparatus as recited in claim 2, wherein the deflection surface is substantially frustoconical.

4. An apparatus as recited in claim 1, further comprising a baffle support extending towards the baffle from a position upstream of the baffle to support the baffle.

5. An apparatus as recited in claim 4, wherein the baffle is slidably mounted on the baffle support, and the baffle includes a locking means to lock the baffle in a desired position.

6. An apparatus as recited in claim 4, wherein the baffle support is threaded and the baffle is threadably mounted on the baffle support, and the baffle is moved by screwing the baffle up or down the threaded baffle support.

7. An apparatus as recited in claim 1, wherein at least one of the guide and baffle are adjustably mounted and the relative positions of the guide and the baffle can be adjusted to achieve a desired distribution.

8. An apparatus as recited in claim 1, wherein the director comprises a chute having inwardly tapered walls which define a convergence position, wherein the baffle is arranged at least partially upstream of the convergence position.

9. An apparatus as recited in claim 8, further comprising a second baffle arranged upstream of the director to deflect the charge radially outwardly.

10. An apparatus as recited in claim 1, further comprising means for moving the guide to and from a masking position adjacent to or abutting with the article, wherein the charge falls onto the article with a border defined by the guide.

11. An apparatus as recited in claim 1, wherein the apparatus is mounted for movement with the article while the charge is distributed.

12. An apparatus as recited in claim 11, further comprising a second apparatus for distributing charge onto an article, the second apparatus including
   a second baffle to deflect at least a portion of the charge radially outwardly;
   a second director arranged upstream of the baffle to direct at least a portion of the charge radially inwardly onto the baffle; and
   a second guide arranged downstream of the baffle to deflect at least a portion of the charge radially inwardly to cause the charge to fall onto the article and to be distributed across the article, wherein the apparatus and the second apparatus are mounted to a common, movably mounted carriage.

13. An apparatus as recited in claim 1, further comprising a weigher located above the baffle for delivering a predetermined weight of charge.

14. A method of distributing a charge falling onto an article, comprising:

directing at least a portion of the charge radially inwardly onto a stationary baffle with a director arranged upstream of the baffle;

deflecting at least a portion of the charge radially outwardly with the baffle; and deflecting at least a portion of the charge radially inwardly with a guide arranged downstream of the baffle to cause the charge to fall onto and to be distributed across the article.

15. A method as recited in claim 14, further comprising the step of adjusting the relative positions of the baffle and the guide to achieve a desired distribution.

16. A method as recited in claim 14, wherein the step of directing comprises converging at least a portion of the charge onto the baffle with a chute having inwardly tapered walls.

17. A method as recited in claim 14, wherein the charge comprises food.

18. A method as recited in claim 17, wherein the article comprises an article of food.

19. A method as recited in claim 14, further comprising the step of moving the article, the baffle and the guide together during distribution of the charge.

20. A method as recited in claim 14, wherein the step of deflecting at least a portion of the charge radially outwardly with a baffle comprises:

deflecting at least a portion of the charge radially outwardly with a first baffle; and deflecting at least a portion of the charge radially outwardly with a second baffle downstream of the first baffle.

21. A method of distributing a charge falling onto an article, comprising:

focusing the charge with a chute to receive the falling charge, the chute having inwardly tapered walls defining a focal position where the charge enters the chute and having an outlet;

deflecting a portion of the charge radially outwardly with a first stationary baffle positioned within the chute, the first baffle having an outwardly angled continuous deflection surface to deflect the portion of the charge radially outwardly;

deflecting a portion of the charge radially outwardly with a second stationary baffle positioned below the outlet of the chute, the second baffle having an outwardly angled continuous deflection surface to deflect the portion of the charge radially outwardly; and deflecting a portion of the charge radially inwardly with a guide positioned below the second baffle and above the article to deflect the portion of the charge radially inwardly to cause the charge to fall on the article with a required distribution.

22. A method as recited in claim 21, wherein at least one of the guide, the first baffle and the second baffle are adjustably mounted and the relative positions of the guide, the first baffle and the second baffle can be adjusted to achieve a desired distribution.

23. A method as recited in claim 21, wherein the respective deflection surfaces of the first and second baffles are frustoconical.

24. A method as recited in claim 23, wherein the angle of the first baffle is greater than the angle of the second baffle.

25. An apparatus for distributing a charge falling onto an article, comprising:

a stationary baffle presenting a continuous deflection surface to the fallen charge, the deflection surface deflecting at least a portion of the charge radially outward; and a guide arranged downstream of the baffle to deflect at least a portion of the charge radially inward to cause the charge to fall onto the article and to be distributed across the article.

26. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide arranged downstream of the baffle to deflect at least a portion of the charge radially inwardly to cause the charge to fall onto the article and to be distributed across the article, wherein the baffle has an outwardly angled deflection surface to deflect the charge radially outwardly, and the deflection surface is substantially frustoconical.

27. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide arranged downstream of the baffle to deflect at least a portion of the charge radially inwardly to cause the charge to fall onto the article and to be distributed across the article, wherein at least one of the guide and baffle are adjustably mounted and the relative positions of the guide and the baffle can be adjusted to achieve a desired distribution.

28. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide arranged downstream of the baffle to deflect at least a portion of the charge radially inwardly to cause the charge to fall onto the article and to be distributed across the article, wherein the director comprises a chute having inwardly tapered walls which define a convergence position, wherein the baffle is arranged at least partially upstream of the convergence position.

29. An apparatus as recited in claim 28, further comprising a second baffle arranged upstream of the director to deflect the charge radially outwardly.

30. An apparatus for distributing a charge falling onto an article, comprising:

a baffle to deflect at least a portion of the charge radially outwardly;

a director arranged upstream of the baffle to direct at least a portion of the charge radially inwardly onto the baffle;

a guide arranged downstream of the baffle to deflect at least a portion of the charge radially inwardly to cause the charge to fall onto the article and to be distributed across the article; and means for moving the guide to and from a masking position adjacent to or abutting with the article, wherein the charge falls onto the article with a border defined by the guide.

31. An apparatus for distributing a charge falling onto an article, comprising:

a baffle to deflect at least a portion of the charge radially outwardly;

a director arranged upstream of the baffle to direct at least a portion of the charge radially inwardly onto the baffle;

a guide arranged downstream of the baffle to deflect at least a portion of the charge radially inwardly to cause the charge to fall onto the article and to be distributed across the article; and a baffle support extending towards the baffle from a position upstream of the baffle to support the baffle, wherein the baffle is slidably mounted on the baffle support, and the baffle includes a locking means to lock the baffle in a desired position.

32. A method of distributing a charge falling onto an article, comprising:

directing at least a portion of the charge radially inwardly onto a baffle with a director arranged upstream of the baffle;

deflecting at least a portion of the charge radially outwardly with the baffle;

deflecting at least a portion of the charge radially inwardly with a guide arranged downstream of the baffle to cause the charge to fall onto and to be distributed across the article; and adjusting the relative positions of the baffle and the guide to achieve a desired distribution.

33. An apparatus to distribute a plurality of charges falling onto an article, comprising:

a stationary baffle to deflect a portion of the charges radially outwardly;

a director arranged upstream of the baffle to direct a portion of the charges radially inwardly onto the baffle; and a guide arranged downstream of the baffle to deflect a portion of the charges radially inwardly to cause the charges to fall onto the article and to be distributed across the article simultaneously.

34. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide, having a cylindrical shape, arranged downstream of the baffle to deflect at least a portion of the charge radially inwardly to cause the charge to fall onto the article and to be distributed across the article, wherein the baffle has an outwardly angled deflection surface to deflect the charge radially outwardly, and the deflection surface is substantially frustoconical.

35. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide, having a cylindrical shape, arranged downstream of the baffle to deflect at least a portion of the charge radially inwardly to cause the charge to fall onto the article and to be distributed across the article, wherein at least one of the guide and baffle are adjustably mounted and the relative positions of the guide and the baffle can be adjusted to achieve a desired distribution.

36. An apparatus for distributing a charge falling onto an article, comprising:

a baffle to deflect at least a portion of the charge radially outwardly;

a director arranged upstream of the baffle to direct at least a portion of the charge radially inwardly onto the baffle; and a guide, having a cylindrical shape, arranged downstream of the baffle to deflect at least a portion of the charge radially inwardly to cause the charge to fall onto the article and to be distributed across the article, wherein the director comprises a chute having inwardly tapered walls which define a convergence position, wherein the baffle is arranged at least partially upstream of the convergence position.

37. An apparatus as recited in claim 36, further comprising a second baffle arranged upstream of the director to deflect the charge radially outwardly.

38. An apparatus for distributing a charge falling onto an article, comprising:

a baffle to deflect at least a portion of the charge radially outwardly;

a director arranged upstream of the baffle to direct at least a portion of the charge radially inwardly onto the baffle;

a guide, having a cylindrical shape, arranged downstream of the baffle to deflect at least a portion of the charge radially inwardly to cause the charge to fall onto the article and to be distributed across the article; and means for moving the guide to and from a masking position adjacent to or abutting with the article, wherein the charge falls onto the article with a border defined by the guide.

39. An apparatus for distributing a charge falling onto an article, comprising:

a baffle to deflect at least a portion of the charge radially outwardly;

a director arranged upstream of the baffle to direct at least a portion of the charge radially inwardly onto the baffle;

a guide, having a cylindrical shape, arranged downstream of the baffle to deflect at least a portion of the charge radially inwardly to cause the charge to fall onto the article and to be distributed across the article; and a baffle support extending towards the baffle from a position upstream of the baffle to support the baffle, wherein the baffle is slidably mounted on the baffle support, and the baffle includes a locking means to lock the baffle in a desired position.

40. A method of distributing a charge falling onto an article, comprising:

directing at least a portion of the charge radially inwardly onto a baffle with a director arranged upstream of the baffle;

deflecting at least a portion of the charge radially outwardly with the baffle;

deflecting at least a portion of the charge radially inwardly with a guide, the guide having a cylindrical shape, arranged downstream of the baffle to cause the charge to fall onto and to be distributed across the article; and adjusting the relative positions of the baffle and the guide to achieve a desired distribution.

* * * * *